(12) United States Patent
Liu et al.

(10) Patent No.: US 12,156,134 B2
(45) Date of Patent: Nov. 26, 2024

(54) METHOD EXECUTED BY USER EQUIPMENT, AND USER EQUIPMENT

(71) Applicant: SHARP KABUSHIKI KAISHA, Sakai (JP)

(72) Inventors: Renmao Liu, Shanghai (CN); Chao Luo, Shanghai (CN); Fangying Xiao, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/422,931

(22) PCT Filed: Jan. 20, 2020

(86) PCT No.: PCT/CN2020/073187
§ 371 (c)(1),
(2) Date: May 23, 2024

(87) PCT Pub. No.: WO2020/156317
PCT Pub. Date: Aug. 6, 2020

(65) Prior Publication Data
US 2022/0159570 A1 May 19, 2022

(30) Foreign Application Priority Data
Jan. 31, 2019 (CN) .......................... 201910102819.1

(51) Int. Cl.
*H04W 52/02* (2009.01)
*H04W 68/00* (2009.01)
(Continued)

(52) U.S. Cl.
CPC ... *H04W 52/0219* (2013.01); *H04W 52/0232* (2013.01); *H04W 68/005* (2013.01);
(Continued)

(58) Field of Classification Search
CPC ............ H04W 24/10; H04W 52/0206; H04W 52/0212; H04W 52/0209; H04W 52/0219; H04W 52/028; H04W 4/70; H04W 4/025
See application file for complete search history.

(56) References Cited

U.S. PATENT DOCUMENTS

2012/0275365 A1  11/2012  Anderson et al.
2012/0275366 A1  11/2012  Anderson et al.
(Continued)

FOREIGN PATENT DOCUMENTS

CN     103636264 A    3/2014
CN     106605432 A    4/2017
(Continued)

OTHER PUBLICATIONS

ZTE Corporation: "Further consideration on UE-group wake-up signal", 3GPP Draft; R2-1817634 Further Consideration on UE-Group Wake-Up Signal, 3rd Generation Partnership Project (3GPP), Mobile Competence Centre ; 650, Route Des Lucioles ; F-06921 Sophia-Antipolis Cedex, vol. RAN WG2, No. Spokane, United States; Nov. 12, 2018-Nov. 16, 2018 Nov. 12, 2018 (Nov. 12, 2018), Sections 2.1-2.5.
(Continued)

*Primary Examiner* — Fred A Casca
(74) *Attorney, Agent, or Firm* — ScienBiziP, P.C.

(57) ABSTRACT

The present invention provides a method executed by a user equipment and a user equipment. The method executed by a user equipment (UE) comprising: receiving, from a base station, system information including a grouping wake-up signal (WUS) configuration for performing grouping wake-up on a WUS group associated with the UE; monitoring a grouping WUS for the WUS group associated with the UE according to the received grouping WUS configuration; and
(Continued)

monitoring a following paging occasion (PO) for detecting a paging message when the grouping WUS is detected.

16 Claims, 1 Drawing Sheet

(51) Int. Cl.
*H04W 72/0446* (2023.01)
*H04W 72/0453* (2023.01)
*H04W 72/23* (2023.01)

(52) U.S. Cl.
CPC ... *H04W 72/0446* (2013.01); *H04W 72/0453* (2013.01); *H04W 72/23* (2023.01)

(56) References Cited

U.S. PATENT DOCUMENTS

| | | | |
|---|---|---|---|
| 2018/0263011 A1 | 9/2018 | Wang et al. | |
| 2019/0028999 A1 | 1/2019 | Yerramalli et al. | |
| 2019/0081743 A1 | 3/2019 | Loehr et al. | |
| 2020/0107267 A1* | 4/2020 | Wu | H04W 76/28 |
| 2020/0145921 A1 | 5/2020 | Zhang et al. | |

FOREIGN PATENT DOCUMENTS

| | | |
|---|---|---|
| CN | 107454665 A | 12/2017 |
| CN | 108668330 A | 10/2018 |
| CN | 108702707 A | 10/2018 |
| CN | 109219116 A | 1/2019 |
| EP | 3226456 A1 | 10/2017 |
| EP | 3826369 A1 | 5/2021 |
| WO | 2018175760 A1 | 9/2018 |
| WO | 2018/204799 A1 | 11/2018 |

OTHER PUBLICATIONS

NTT DOCOMO, Inc: "UE-group wake-up signal for Rel.16 IoT", 3GPP Draft; R1-1811385, 3rd Generation Partnership Project (3GPP), Mobile Competence Centre ; 650, Route Des Lucioles ; F-06921 Sophia-Antipolis Cedex ; France, vol. RAN WG1, No. Chengdu, China; Oct. 8, 2018-Oct. 12, 2018 Sep. 29, 2018 (Sep. 29, 2018), Figure 1, Sections 1, 2.1-2.3.

Ericsson, Huawei, "New WID on Rel-16 enhancements for NB-IoT", RP-181451 3GPP TSG RAN Meeting #80, La Jolla, USA, Jun. 11-14, 2018.

Ericsson, New WID on Rel-16 MTC enhancements for LTE, RP-181450 3GPP TSG RAN Meeting #80, La Jolla, USA, Jun. 11-14, 2018.

3GPP TS 36.304 V15.1.0 (Sep. 2018) 3rd Generation Partnership Project; Technical Specification Group Radio Access Network; Evolved Universal Terrestrial Radio Access (E-UTRA); User Equipment (UE) procedures in idle mode (Release 15).

* cited by examiner

METHOD EXECUTED BY USER EQUIPMENT, AND USER EQUIPMENT

CROSS-REFERENCE TO RELATED APPLICATION(S)

The present application claims the benefit of and priority to a CN Patent Application Serial No. 201910102819.1, filed on Jan. 31, 2019, entitled "METHOD EXECUTED BY USER EQUIPMENT, AND USER EQUIPMENT". The disclosure is hereby incorporated fully by reference into the present application.

FIELD

The present application relates to the technical field of wireless communication, and more particularly, to a method executed by a user equipment and a user equipment.

BACKGROUND

A new R16 work item regarding further enhancement of NarrowBand Internet of Things (NB-IoT) (see RP-181451: New WID on R16 enhancement for NB-IoT) and a new R16 work item regarding further enhancement of Machine Type Communication (MTC) (see RP-181450: New WID on Rel-16 MTC enhancements for LTE) were approved at the 3rd Generation Partnership Project (3GPP) RAN #80 plenary meeting held in June 2018. One of the objects of the above work items is to introduce a user equipment (UE) grouping-based wake-up signal (WUS) to further reduce the energy consumption of a user equipment (UE).

In the 3GPP Rel-14 standard specification, for the UE staying in an idle mode, the use of the paging scheme can reduce the power consumption of the UE. When the channel state of the UE is not good and thus the coverage enhancement needs to be used, a physical downlink control channel (PDCCH) and/or a physical downlink shared channel (PDSCH) needs to be repeatedly transmitted, so that the UE can correctly receive information from a base station or correctly transmit information to the base station. Before detecting a paging message, the UE needs to wake up from a sleep state to detect whether there is its own paging message on each paging occasion (PO). In most of the time, the UE does not have a paging message. Thus, when the UE stays in a coverage enhancement state, it needs to repeatedly receive PDCCH or PDSCH multiple times to detect whether there is its own paging message; however, in most of the time, the UE does not have its own paging message. Therefore, the power of the UE is greatly consumed. For MTC or NB-IoT users, it is extremely important to reduce the power consumption of the UE. Therefore, in the 3GPP Rel-15 standard specification, a wake-up signal is introduced for the UE staying in an idle state. That is, a wake-up signal is designed before a page message is detected in each PO. If the UE has detected the wake-up signal, the UE detects a paging message in a subsequent PO. If the UE has not detected the wake-up signal, the UE does not detect a paging message in a subsequent PO and directly returns back to a sleep state. In the above-mentioned Rel-16 work items, it is proposed to support a UE grouping-based wake-up signal (UE-group WUS) to further reduce the power consumption of the UE. In the UE grouping-based WUS, the UE can only monitor the WUS corresponding to the UE group associated with the UE itself. However, how to configure and use the UE grouping-based WUS and how to multiplex the UE grouping-based WUS and the existing Rel-15 WUS are problems to be solved, and the disclosure provides solutions to the problems.

SUMMARY

In order to solve the above problems in the prior art, the present invention provides a method executed by a user equipment and a user equipment.

According to a first aspect of the present invention, a method executed by a user equipment UE comprising: receiving, from a base station, system information including a grouping wake-up signal (WUS) configuration for performing grouping wake-up on a WUS group associated with the UE; monitoring a grouping WUS for the WUS group associated with the UE according to the received grouping WUS configuration; and monitoring a following paging occasion (PO) for detecting a paging message when the grouping WUS is detected.

In the above method, the grouping WUS configuration includes a number of WUS groups.

In the above method, further comprising determining an index of the WUS group associated with the UE based on the number of WUS groups.

In the above method, further comprising determining the index of the WUS group associated with the UE, on a paging carrier where the UE is located, based on a weight of the paging carrier and a maximum value in the weight.

In the above method, the grouping WUS includes a Rel-15 grouping WUS for performing grouping wake-up on each UE divided group of a Rel-15 WUS group; and a Rel-16 grouping WUS for performing grouping wake-up on each UE divided group of a Rel-16 WUS group.

In the above method, the WUS group is divided based on a time offset to obtain the UE divided group on which the grouping wake-up is performed, the time offset is a time offset value between an ending time of the grouping WUS and a starting time of the PO corresponding to the grouping WUS, and the time offset includes: a first time offset timeoffsetDRX corresponding to discontinuous reception (DRX), a second time offset timeoffset-eDRX-Short corresponding to enhanced DRX, and a third time offset timeoffset-eDRX-Long.

In the above method, UEs that are grouped and configured after the Rel-16 WUS group is grouped based on the time offset are further divided into groups.

In the above method, the grouping WUS configuration includes a common WUS for waking up all of the UE divided groups of the Rel-16 WUS group at a same time; and a partial WUS for waking up a part of the UE divided groups of the Rel-16 WUS group.

In the above method, the Rel-15 grouping WUS and the Rel-16 grouping WUS are multiplexed based on at least one of a time division multiplexing scheme, a single code division multiplexing scheme, and a single code division multiplexing plus time division multiplexing scheme.

In the above method, when the time division multiplexing scheme is used, UEs adopting the Rel-16 grouping WUS and UEs adopting the Rel-15 grouping WUS are multiplexed on different time-frequency resources; when the single code division multiplexing scheme is used, the UEs adopting the Rel-16 grouping WUS and the UEs adopting the Rel-15 grouping WUS are multiplexed on a same time-frequency resource; and when the single code division multiplexing plus time division multiplexing scheme is used, a part of the UEs adopting the Rel-16 grouping WUS and all the UEs adopting the Rel-15 grouping WUS are multiplexed on a same time-frequency resource, and the other UEs adopting the Rel-16 grouping WUS are multiplexed on one or more time-frequency resources different from the same time-frequency resource.

According to a second aspect of the present invention, a user equipment is provided and comprises: a processor; and a memory configured to store instructions; wherein the instructions, when executed by the processor, may perform the method of the user equipment described in this disclosure.

BRIEF DESCRIPTION OF THE DRAWINGS

The above and other features of the present application will become more apparent with the following detailed description in conjunction with the accompanying drawings.

DETAILED DESCRIPTION OF THE PREFERRED EMBODIMENTS

The present application will be described in detail with reference to the accompanying drawings and specific implementations. It should be noted that the present application should not be limited to the specific embodiments described below. In addition, for the sake of simplicity, detailed descriptions of well-known technologies that are not directly related to the present application are omitted in order to prevent confusion in understanding the present application.

Figure 1:
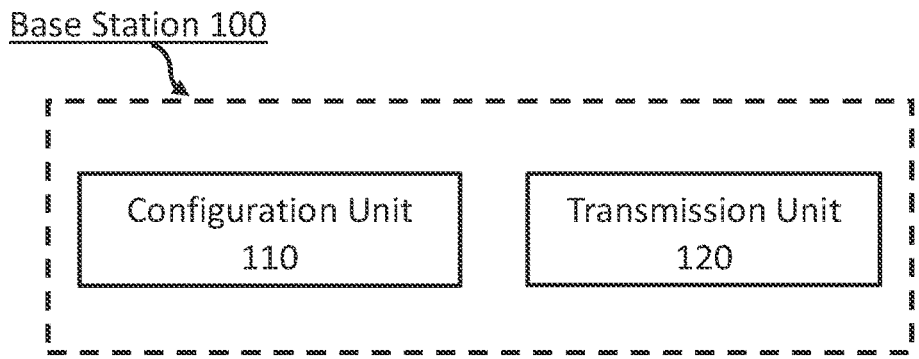
FIG. 1 shows a block diagram of a base station according to an embodiment of the present application.

FIG. 1 shows a block diagram of a base station 100 according to an embodiment of the present application. As shown in FIG. 1, the base station 100 includes a configuration unit 110 and a transmission unit 120. It will be understood by those skilled in the art that the base station 100 may also include other functional units required to perform its functions, such as various processors, memories, radio frequency signal processing units, baseband signal processing units, and other physical downlink channel transmission processing units, and the like. However, detailed descriptions for these well-known elements are omitted for simplicity.

The configuration unit 110 configures for a user equipment (UE) a grouping wake-up signal and a method for multiplexing the grouping wake-up signal and an existing wake-up signal via physical layer signaling and/or media access control (MAC) signaling and/or radio resource control (RRC) signaling and/or system information (SI). The transmission unit 120 transmits the configuration information to the UE by using a physical downlink control channel (PDCCH) or a physical downlink shared channel (PDSCH).

Figure 2:
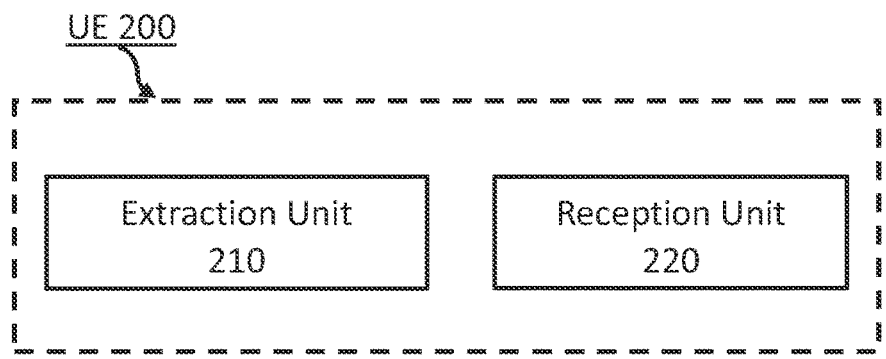
FIG. 2 shows a block diagram of a user equipment according to an embodiment of the present application.

FIG. 2 shows a block diagram of a user equipment (UE) 200 according to an embodiment of the present application. As shown in FIG. 2, the UE 200 includes an extraction unit 210 and a reception unit 220. It will be understood by those skilled in the art that the UE 200 may also include other functional units required to perform its functions, such as various processors, memories, radio frequency signal processing units, baseband signal processing units, and other physical uplink channel transmission processing units, and the like. However, detailed descriptions for these well-known elements are omitted for simplicity.

The extraction unit 210 is used for the UE to extract, from the received physical layer signaling and/or MAC signaling and/or RRC signaling and/or system information, the configuration information transmitted from the base station and related to the grouping wake-up signal and the method for multiplexing the grouping wake-up signal and the existing wake-up signal. The reception unit 220 receives the configuration information transmitted from the base station via the physical downlink control channel or the physical downlink shared channel.

The base station described in the present invention is an entity for communicating with the user equipment and may also refer to a Node B, an evolved Node B (eNB), a gNB (Next generation Node B), or an access point (AP).

The user equipment described in the present invention may also refer to a terminal, an access terminal, a station point, a mobile station, or the like. The user equipment may be a cellular phone, a personal digital assistant (PDA), a cordless phone, a notebook computer, a mobile phone, a smartphone, a handheld device, a netbook, or the like.

The physical downlink control channel described by the present invention may refer to a PDCCH in 3GPP LTE/LTE-A (Long Term Evolution/Long Term Evolution-Advanced) or 5G NR (New Radio), an MTC PDCCH (MPDCCH) used for machine type communication, an narrowband PDCCH (NPDCCH) used for narrowband Internet of Things communication, or the like. The physical downlink shared channel may refer to a PDSCH in 3GPP LTE/LTE-A (Long Term Evolution/Long Term Evolution-Advanced) or 5G NR, an NPDSCH used for narrowband Internet of Things communication, or the like.

Different embodiments may also be combined to operate together.

Some concepts involved in the present disclosure are described below first. It should be noted that some names in the following description are merely exemplary and illustrative and not limiting, and other names may be used.

Anchor carrier: an anchor carrier, for a frequency division duplexing (FDD) system, refers to a carrier that the UE recognizes to transmit an NB-IoT-related narrowband physical broadcast channel (NPBCH), narrowband primary synchronization signal (NPSS)/narrowband secondary synchronization signal (NSSS), system information block narrowband (SIB-NB), or the like. An anchor carrier, for a time division duplexing (TDD) system, refers to a carrier that the UE recognizes to transmit an NB-IoT-related physical broadcast channel (NPBCH), primary synchronization signal (NPSS)/secondary synchronization signal (NSSS), or the like. That is, the UE receives synchronization signals, broadcast channels and/or system information on the anchor carrier. In the present disclosure, for convenience of description, unless otherwise specified, an uplink carrier corresponding to the anchor carrier is also referred to as an anchor carrier or an uplink anchor carrier. In the FDD system, an uplink carrier corresponding to the anchor carrier is generally indicated to the UE via frequency information (e.g., ul-carrierfreq information element) in the system information block 2.

Non-anchor carrier: a non-anchor carrier, for a FDD system, refers to a carrier that the UE recognizes not to transmit data such as an NB-IoT-related NPBCH, NPSS, NSSS, SIB-NB, or the like, and a non-anchor carrier, for a TDD system, refers to a carrier that the UE recognizes not to transmit data such as an NB-IoT-related NPBCH, NPSS, NSSS, or the like. That is, the UE recognizes that a non-anchor carrier is only used for receiving or transmitting unicast transmission data such as an NB-IoT-related physical downlink control channel (PDCCH), physical downlink shared channel (PDSCH), physical uplink shared channel (PUSCH), or the like.

CarrierConfigDedicated-NB information element: this information element is used for configuring a carrier in an NB-IoT system. The carrier may be an anchor carrier or a non-anchor carrier. The configuration includes an uplink carrier configuration and a downlink carrier configuration, wherein the downlink carrier configuration includes one or more pieces of frequency information of the carrier, available downlink subframe information, non-anchor carrier downlink gap information, in-band carrier information, and the like. The uplink carrier configuration includes uplink carrier frequency information and/or TDD uplink and downlink alignment offset information, or the like. This information element is generally included in a physicalconfigdedicated information element in a radioresourceconfigdedicated information element and transmitted to the UE via UE-specific RRC information such as an RRC connection reconfiguration message, wherein radioresourceconfigdedicated is used for establishing/modifying/releasing a radio bearer, modifying a radio MAC configuration, modifying a dedicated physical layer configuration, and the like, and the physicalconfigdedicated information element is used for specifying a UE-specific physical channel configuration.

dl-configList information element: this element is included in system information and used for configuring a non-anchor carrier used for paging and random access procedures. In addition, this element includes a non-anchor carrier configuration list.

ul-configList information element: this element is included in system information and used for configuring a non-anchor carrier used for a random access procedure, and this element includes a non-anchor carrier list.

Enhanced coverage level: in the enhanced coverage technology, the degree of coverage required to be enhanced is categorized into a plurality of enhanced coverage levels. For example, in NB-IoT, three enhanced coverage levels are defined. In MTC, four enhanced coverage levels are defined. In some enhanced coverage methods, each enhanced coverage level may correspond to a different set of wireless parameter configurations such as random access configurations (e.g., Physical Random Access Channel (PRACH) resources). When initiating a random access procedure, the MAC layer of the UE can determine a enhanced coverage level of the UE according to a measured reference signal received power (RSRP) and an RSRP threshold value received from system information and used for determining the enhanced coverage level, and can select corresponding random access resources (e.g., preamble) and parameters (e.g., random access response window size) according to the determined enhanced coverage level to initiate a random access procedure.

Paging Scheme in LTE:

In the 3GPP Rel-14 standard specification, the UE staying in an idle mode may use the discontinuous reception (DRX) to reduce power consumption. A paging occasion (PO) is a subframe, on which there may be a PDCCH, an MPDCCH, or an NPDCCH that is scrambled with a P-RNTI (Paging-Radio Network Temporary Identifier) and configured to schedule a paging message. In the case of an MPDCCH scrambled with a P-RNTI, the PO refers to a starting subframe of MPDCCH repetitions. In the case of an NPDCCH scrambled with a P-RNTI, the PO refers to a starting subframe of NPDCCH repetitions unless the subframe determined by the PO is not a valid NB-IoT downlink subframe. When the subframe determined by the PO is not a valid NB-IoT downlink subframe, the first valid NB-IoT downlink subframe after the PO is the starting subframe of the NPDCCH repetitions.

A paging frame (PF) is one radio frame that may include one or more POs. When DRX is used, the UE only needs to monitor one PO per DRX cycle.

A paging narrowband (PNB) is one narrowband, on which the UE receives a paging message.

PF, PO, and PNB are determined by the following equations using DRX parameters provided in system information.

PF is given by the following equation:

$$\text{SFN mod } T = (T \text{ div } N)*(\text{UE\_ID mod } N) \tag{1}$$

The PO can be obtained by looking up Table 1, Table 2, Table 3, or Table 4 by using an index i_s according to the duplex mode and system bandwidth. The index i_s is obtained by the following equation:

$$i\_s = \text{floor}(\text{UE\_ID}/N) \text{mod } Ns \tag{2}$$

For FDD:

Table 1 (for a case where PDCCH or NPDCCH is scrambled by P-RNTI, or MPDCCH is scrambled with P-RNTI, and the system bandwidth is greater than 3 MHz)

TABLE 1

| Ns | PO, i_s = 0 | PO, i_s = 1 | PO, i_s = 2 | PO, i_s = 3 |
|---|---|---|---|---|
| 1 | 9 | N/A | N/A | N/A |
| 2 | 4 | 9 | N/A | N/A |
| 4 | 0 | 4 | 5 | 9 |

Table 2 (for a case where MPDCCH is scrambled by P-RNTI, and the system bandwidth is 1.4 MHz and 3 MHz)

TABLE 2

| Ns | PO, i_s = 0 | PO, i_s = 1 | PO, i_s = 2 | PO, i_s = 3 |
|---|---|---|---|---|
| 1 | 5 | N/A | N/A | N/A |
| 2 | 5 | 5 | N/A | N/A |
| 4 | 5 | 5 | 5 | 5 |

For TDD (all uplink/downlink configurations):

Table 3 (for a case where PDCCH is scrambled by P-RNTI, or MPDCCH is scrambled with P-RNTI, and the system bandwidth is greater than 3 MHz)

TABLE 3

| Ns | PO, i_s = 0 | PO, i_s = 1 | PO, i_s = 2 | PO, i_s = 3 |
|---|---|---|---|---|
| 1 | 0 | N/A | N/A | N/A |
| 2 | 0 | 5 | N/A | N/A |
| 4 | 0 | 1 | 5 | 6 |

Table 4 (for a case where MPDCCH is scrambled by P-RNTI, and the system bandwidth is 1.4 MHz and 3 MHz)

TABLE 4

| Ns | PO, i_s = 0 | PO, i_s = 1 | PO, i_s = 2 | PO, i_s = 3 |
|---|---|---|---|---|
| 1 | 1 | N/A | N/A | N/A |
| 2 | 1 | 6 | N/A | N/A |
| 4 | 1 | 1 | 6 | 6 |

If the detected MPDCCH is scrambled by the P-RNTI, the paging narrowband PNB is determined by the following equation:

$$PNB = \text{floor}(UE\_ID/(N*Ns)) \bmod Nn \quad (3)$$

If the detected NPDCCH is scrambled by the P-RNTI and the UE supports the reception of a paging message on a non-anchor carrier, and if configuration information of the paging message for the non-anchor carrier is provided in system information, then the paging carrier is determined by the smallest paging carrier n (0≤n≤Nn−1) fulfilling the following equation (4):

$$\text{floor}(UE\_ID/(N*Ns)) \bmod W \leq W(0) + W(1) + \ldots + W(n) \quad (4)$$

System information DRX parameters stored in the UE need to be updated locally in the UE whenever the DRX parameters are changed in the system information. If the UE has no International Mobile Subscriber Identity (IMSI), for example, if the UE needs to make an emergency call without a Universal Subscriber Identity Module (USIM), then the UE needs to use the default identity UE_ID=0 in the PF, i_s, and PNB equations described above.

The following parameters are used for calculating the PF, i_s, PNB, and the NB-IoT paging carrier:

T: DRX cycle of the UE. Except for NB-IoT, if a higher layer configures a UE-specific extended DRX value of 512 radio frames, T=512. Otherwise, T is determined by the shortest DRX cycle of both a UE-specific DRX cycle (if allocated by a higher layer) and a default DRX cycle broadcasted in system information. If a higher layer does not configure the UE-specific DRX cycle, a default DRX cycle is applied. The UE-specific DRX cycle is not applicable to NB-IoT.

N: min(T, nB)

Ns: max(I, nB/T)

Nn: number of paging narrowbands provided in system information

UE_ID:

IMSI mod 1024 if P-RNTI is scrambled on PDCCH

IMSI mod 4096 if P-RNTI is scrambled on NPDCCH

IMSI mod 16384 if P-RNTI is scrambled on MPDCCH or P-RNTI is scrambled on NPDCCH, and the UE supports receiving a paging message on a non-anchor carrier, and if the configuration information of the paging message is provided in the system information for the non-anchor carrier.

maxPagingCarriers: number of configured paging carriers provided in system information W(i): weight for NB-IoT paging carrier i W: total weight of all NB-IoT paging carriers, i.e., W=W(0)+W(1)+ . . . +W(Nn−1)

The IMSI is a sequence of decimal numbers (0 . . . 9) and interpreted in the equation as a decimal integer number, where the first digit is the highest order digit, and so on. For example, IMSI=12 (digit1=1, digit2=2), which is interpreted as a decimal number "12", not "1*16+2=18" in the calculations.

In the 3GPP Rel-14 standard specification, for the UE staying in an idle mode, the use of the paging scheme can reduce the power consumption of the UE. When the channel state of the UE is not good and thus the coverage enhancement needs to be used, PDCCH and/or PDSCH needs to be repeatedly transmitted, so that the UE can correctly receive information from a base station or correctly transmit information to the base station. Before detecting a paging message, the UE needs to wake up from a sleep state to detect whether there is its own paging message in each PO. In most of the time, the UE does not have a paging message. Thus, when the UE stays in a coverage enhancement state, it needs to repeatedly receive PDCCH or PDSCH for multiple times to detect whether there is its own paging message; however, in most of the time, the UE does not have its own paging message. Therefore, the power of the UE is greatly consumed. For MTC or NB-IoT users, it is extremely important to reduce the power consumption of the UE. Therefore, in the 3GPP Rel-15 standard specification, a wake-up signal is introduced for the UE staying in an idle state. That is, a wake-up signal is set before a page message is detected in each PO. If the UE has detected the wake-up signal, it detects a paging message in a subsequent PO, that is, the UE detects a PDCCH (or MPDCCH or NPDCCH) scrambled with P-RNTI and receives a PDSCH (or NPDCCH) scheduled by the PDCCH (or MPDCCH or NPDCCH). If the UE has not detected the wake-up signal, it does not detect a paging message in a subsequent PO and directly returns back to the sleep state.

In order to further reduce the power consumption of the UE, a UE grouping-based wake-up signal can be introduced. For example, UEs corresponding to a certain PO may be divided into several groups, and a certain group or multiple groups of UEs use one WUS. For backward compatibility, the newly introduced UE-group WUS or Rel-16 UE-group WUS should not affect the existence and performance of the existing Rel-15 WUS. That is, when the system supports a Rel-16 UE-group WUS, it can also support a Rel-15 WUS. In addition, since not all Rel-16 UEs support the UE-group WUS function, the Rel-16 UEs need to be divided into UEs that support a UE-group WUS and UEs that do not support a UE-group WUS. Therefore, there are three types of UEs supporting the WUS function in the Rel-16 system: a Rel-15 WUS UE or a legacy WUS UE (LWUS UE), a UE that does not support a UE-group WUS (NGWUS UE), and a UE that supports a UE-group WUS (GWUS UE). The following embodiments of the present disclosure provide a method for solving the problems on how to configure a UE-group GWUS and how to multiplex a GWUS and a LWUS. The UE grouping-based GWUS transmission can be realized through the method, so that the UE can obtain and learn the GWUS configuration and can monitor an associated GWUS based on UE grouping so as to achieve the objective of energy saving.

Figure 3:
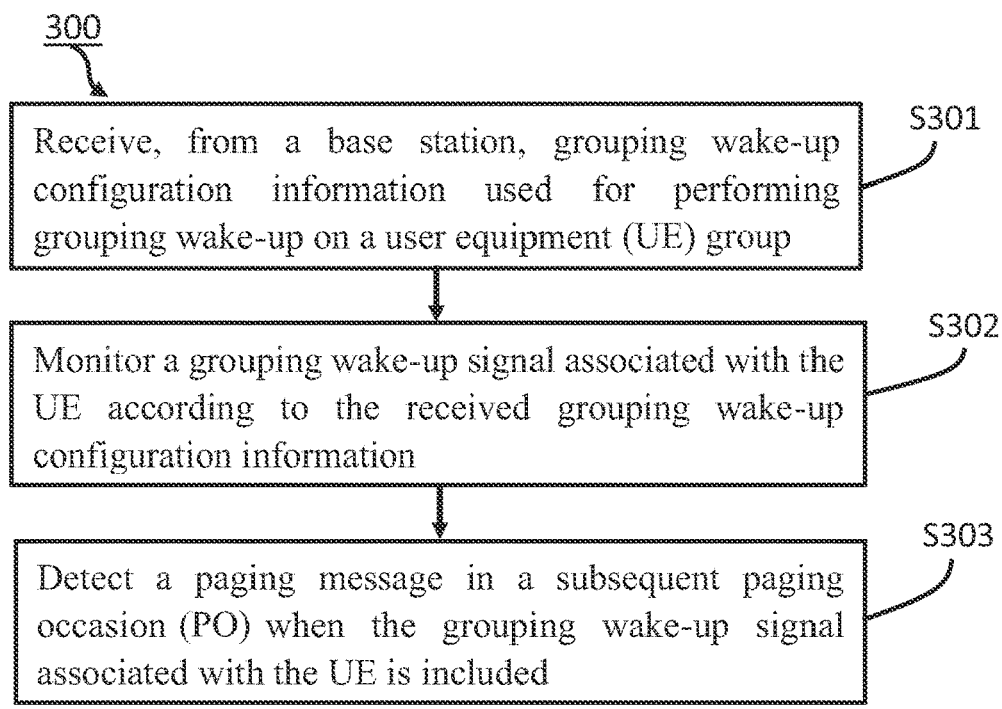
FIG. 3 shows a flowchart of a method executed by a user equipment UE according to an embodiment of the present disclosure.

Next, a method executed by a user equipment UE in the present disclosure will be described, and specifically, the method performed by the user equipment UE in a case where grouping wake-up is performed on a UE group of user equipment UEs based on a grouping wake-up signal is described. FIG. 3 shows a flowchart of a method 300 executed by a user equipment UE according to an embodiment of the present disclosure.

As shown in FIG. 3, in step 301, a user equipment UE receives, from a base station, grouping wake-up configuration information used for performing grouping wake-up on a user equipment UE group.

For example, the grouping wake-up configuration information may include a grouping number Nmax of the UE group. In addition, for example, a UE grouping number N(i) on a paging carrier i where the UE is located may be determined based on the grouping number Nmax, a weight W(i) of the paging carrier i, and a maximum value Wmax in the weight W(i).

Further, the UE grouping number N(i) can be obtained by the following equation:

$$N(i) = \text{Ceil}(Nmax*(W(i)/Wmax)),$$

where i=0, . . . Nn−1, and Nn is the number of carriers that can be used for paging.

In addition, in step S302, a grouping wake-up signal associated with the UE is monitored according to the received grouping wake-up configuration information.

The grouping wake-up signal may include, for example, a Rel-15 grouping wake-up signal for performing grouping wake-up on each UE divided group of a Rel-15 UE group and a Rel-16 grouping wake-up signal for performing grouping wake-up on each UE divided group of a Rel-16 UE group.

Further, the grouping wake-up configuration information may include a common wake-up signal for waking up all of UE divided groups of a Rel-16 UE group at the same time, and a partial wake-up signal for waking up a part of the UE divided groups of the Rel-16 UE group.

In step S303, the UE detects a paging message in a subsequent PO when the grouping wake-up signal associated with the UE is included.

Besides, the UE group may be divided, for example, based on a time offset to obtain the UE divided group on which the grouping waken-up is performed, wherein the time offset is a time offset value between an ending time of the grouping wake-up signal and a starting time of a paging occasion PO corresponding thereto. The time offset may include a first time offset timeoffsetDRX corresponding to Discontinuous Reception DRX, a second time offset timeoffset-eDRX-Short corresponding to enhanced DRX, and a third time offset timeoffset-eDRX-Long.

Further, user equipments (UEs) obtained after the Rel-16 UE group are divided and configured based on the time offset may be further divided into groups.

For example, the Rel-15 grouping wake-up signal and the Rel-16 grouping wake-up signal may be multiplexed based on at least one of a time division multiplexing scheme, a single code division multiplexing scheme, and a single code division multiplexing plus time division multiplexing scheme.

In addition, the user equipment 200 shown in FIG. 2 may also include a processor and a memory. The processor may include, for example, a microprocessor, a microcontroller, an embedded processor, or the like. The memory may include, for example, a volatile memory (e.g., random access memory (RAM)), a hard disk drive (HDD), a non-volatile memory (e.g., flash memory), or other memory system. The memory has program instructions stored thereon. The instructions, when executed by the processor, may perform the methods executed by the user equipment, which have been described above in detailed according to the present disclosure.

Hereinafter, concrete examples and embodiments of the present disclosure will be described. In addition, as described above, the examples and embodiments disclosed in the present disclosure are exemplary illustrations for ease of understanding the present invention and are not intended to limit the present invention.

Embodiment 1

In the embodiment 1, the configuration of a UE grouping number for a paging carrier will be described as an example.

In the existing 3GPP LTE/LTE-A standard (see non-Patent Literature: 3GPP TS 36.304 V15.1.0 (2018 September) "User Equipment (UE) procedures in idle mode (Release15)"), different weights may be configured for different paging carriers, so that the numbers of UEs paged on different paging carriers are different. The paging carrier with a greater weight has more UEs paged thereon. A case where a wake-up signal for a certain UE and a paging message for the same UE are on the same paging carrier is taken for example. In this case, if the number of UEs paged on a certain paging carrier is greater, the number of UEs wakened by a wake-up signal on the paging carrier is also greater. The UE grouping number corresponding to a UE-group WUS of the paging carrier may be determined according to the weight of the paging carrier. For example, there are Nn paging carriers in a system, and the weight corresponding to the paging carrier i is $W(i)(0 \leq i \leq Nn-1)$, and Wmax is the maximum value in $W(i)$. Each of all paging carriers may be configured with a UE grouping number, and the UE grouping number is the maximum grouping number Ngmax. The UE grouping number corresponding to the paging carrier with the weight Wmax is Ngmax, and the UE grouping number corresponding to other paging carriers can be obtained by the weight $W(i)$ of the paging carrier, Wmax, and Ngmax. For example, the grouping number corresponding to the paging carrier i is $Ng(i)=\text{ceil}(Ngmax*(W(i)/Wmax))$. Alternatively, the grouping number corresponding to the paging carrier i may be obtained by other mathematical formulas.

In a Rel-16 UE-group WUS design, a common wake-up signal or a common UE group may be introduced to wake up all Rel-16 UE-group WUS UEs at the same time. A wake-up signal that wakes up a part of UE groups or a sub-UE group may also be introduced to wake up UEs of a certain number of UE groups at the same time. For example, there are four UE groups G1, G2, G3, and G4 in total. In addition to four GWUSs: GWUS1, GWUS2, GWUS3, and GWUS4 allocated respectively to the four UE groups, a wake-up signal may be configured for G1+G2, G1+G3, G1+G4, G1+G2+G3, or G2+G3+G4 to wake up the UEs in the above combination of groups. In addition, there are existing Rel-15 WUS UEs and Rel-16 UEs that do not support a UE-group WUS but support a Rel-15 WUS. Both types of UEs can operate with the Rel-15 WUS. Therefore, both types of UEs can be classified as Rel-15 WUS UEs.

When the UE grouping number is configured or calculated, a common group and/or a sub-UE group and/or a Rel-15 UE group are/is not included in the configured UE grouping number M. The base station and the UE can determine a UE group ID (G-ID) for a UE group where the UE is located according to a UE-ID and a configured UE grouping number M. For example, G-ID=UE-ID mod M. In this way, the UE can detect its corresponding GWUS according to the obtained G-ID. It is then determined whether other wake-up signals need to be detected according to whether a common wake-up signal and/or a sub-UE group and/or a Rel-15 UE group are/is configured.

Alternatively, when the UE grouping number is configured or calculated, a common group and/or a sub-UE group and/or a Rel-15 UE group are/is included in the configured UE grouping number M. The base station and the UE can obtain the grouping number M1 of Rel-16 GWUS UEs by subtracting the grouping number of the common group(s) and/or the sub-UE group(s) and/or the Rel-15 UE group(s) from the configured UE grouping number M according to whether the common group(s) and/or the sub-UE group(s) and/or the Rel-15 UE group(s) are/is configured or not. For example, if the grouping number of the common group(s) is 1, the grouping number of the sub-UE group(s) is 3, and the grouping number of the Rel-15 UE group(s) is 1, then M1=M−1−3−1=M−5. The base station and the UE can determine a UE group ID G-ID for a UE group where the UE is located according to a UE-ID and an obtained grouping number M1 of Rel-16 GWUS UEs. For example, G-ID=UE-ID mod M1. In this way, the UE can detect its corresponding GWUS according to the obtained G-ID. It is then determined whether other wake-up signals need to be detected according to whether a common wake-up signal and/or a sub-UE group and/or a Rel-15 UE group are/is configured.

The configuration method according to the present embodiment may be performed via physical layer signaling and/or media access control (MAC) signaling and/or radio resource control (RRC) signaling and/or system information (SI).

Embodiment 2

In the embodiment 2, the configuration of the UE grouping number for a time offset will be described as an example.

In a Rel-15 WUS configuration, there is a time offset that indicates a time offset value between an ending time of a WUS signal and a starting time of a PO corresponding thereto and is also referred to as a time gap. One time offset timeoffset DRX is configured for DRX, and two time offset values timeoffset-eDRX-Short and timeoffset-eDRX-Long may be configured for enhanced DRX (eDRX) (see non-Patent Literature: 3GPP TS 36.304 V15.1.0 (2018 September) "User Equipment (UE) procedures in idle mode (Release15)").

Rel-15WUS UEs can be divided into three UE groups based on the configuration of DRX/eDRX time offsets or time gaps, i.e., timeoffsetDRX, timeoffset-eDRX-Short and timeoffset-eDRX-Long.

In a Rel-16 UE-group WUS design, the existing UE groups based on DRX/eDRX time offset should be supported, and a UE-group WUS is introduced on this basis. In other words, the UEs configured based on DRX/eDRX time offsets timeoffsetDRX, timeoffset-eDRX-Short, and timeoffset-eDRX-Long can be further divided. For example, the UEs configured based on the time offset timeoffsetDRX are further divided into four UE groups with each group allocated with a wake-up signal WUS, that is, there are four WUS allocated in total: GWUS1, GWUS2, GWUS3 and GWUS4 corresponding respectively to the four UE groups G1, G2, G3 and G4 of the UEs configured based on the time offset timeoffsetDRX. Before detecting a paging message in each PO, the UEs of a certain UE group only need to detect a corresponding GWUS, and if these UEs have detected the GWUS corresponding to the certain UE group, they detect a paging message in a subsequent PO, that is, these UEs detect a PDCCH (or MPDCCH or NPDCCH) scrambled with P-RNTI and receive a PDSCH (or NPDSCH) scheduled by the PDCCH (or MPDCCH or NPDCCH). If these UEs have not detected a WUS corresponding to the certain UE group, they do not detect a paging message in a subsequent PO and directly return back to a sleep state.

The UE grouping number can be configured based on time offsets or time gaps, that is, different UE grouping number can be configured for the three time offsets timeoffsetDRX, timeoffset-eDRX-Short and timeoffset-eDRX-Long configured by DRX/eDRX. Alternatively, a same UE grouping number may be configured for all time offsets of DRX/eDRX, that is, the configuration of the same UE grouping number is adopted, and the configured UE grouping number is functioning on all DRX/eDRX time offsets or time gaps.

Alternatively, a total UE grouping number may be configured for all time offsets configured by DRX/eDRX. However, the UE grouping number configured for a certain time offset can be obtained in a pre-configured, predefined, or implicit means. For example, if the total configured UE grouping number is 9 and three time offset values are configured, then the UE grouping number configured for each time offset is 3, that is, the UE grouping number configured for each time offset=the total UE grouping number/the number of configured time offset values. Alternatively, if the configured total UE grouping number is 8, then the UE grouping number configured for the time offset timeoffsetDRX is 4, the UE grouping number configured for the time offset timeoffset-eDRX-Short is 2, and the UE grouping number configured for the time offset timeoffset-eDRX-Long is 2. Alternatively, if the configured total UE grouping number is 6, then the UE grouping number configured for the time offset timeoffsetDRX is 3, the UE grouping number configured for the time offset timeoffset-eDRX-Short is 2, and the UE grouping number configured for the time offset timeoffset-eDRX-Long is 1.

In a Rel-16 UE-group WUS design, a common wake-up signal or a common UE group may be introduced to wake up all Rel-16 UE-group WUS UEs at the same time. A wake-up signal that wakes up a part of UE groups or a sub-UE group may also be introduced to wake up UEs of a certain number of UE groups at the same time. For example, there are four UE groups G1, G2, G3, and G4 in total. In addition to four GWUSs: GWUS1, GWUS2, GWUS3, and GWUS4 allocated respectively to the four UE groups, a wake-up signal may be configured for G1+G2, G1+G3, G1+G4, G1+G2+G3, or G2+G3+G4 to wake up the UEs in the above combination of groups. In addition, there are existing Rel-15 WUS UEs and Rel-16 UEs that do not support a UE-group WUS but support a Rel-15 WUS. Both types of UEs can operate with the Rel-15 WUS. Therefore, both types of UEs can be classified as Rel-15 WUS UEs.

When the UE grouping number is configured or calculated, a common group and/or a sub-UE group and/or a Rel-15 UE group are/is not included in the configured UE grouping number. The base station and the UE can determine a UE group ID G-ID for a UE group where the UE is located according to a UE-ID and a configured UE grouping number M. For example, G-ID=UE-ID mod M. In this way, the UE can detect its corresponding GWUS according to the obtained G-ID. It is then determined whether other wake-up signals need to be detected according to whether a common wake-up signal and a sub-UE group are configured.

Alternatively, when the UE grouping number is configured or calculated, a common group and/or a sub-UE group and/or a Rel-15 UE group are/is included in the configured UE grouping number M. The base station and the UE can obtain the grouping number M1 of Rel-16 GWUS UEs by subtracting the grouping number of the common group(s) and/or the sub-UE group(s) and/or the Rel-15 UE group(s) from the configured UE grouping number M according to whether the common group(s) and/or the sub-UE group(s) and/or the Rel-15 UE group(s) are/is configured or not. For example, if the grouping number of the common group(s) is 1, the grouping number of the sub-UE group(s) is 3, and the grouping number of the Rel-15 UE group(s) is 1, then M1=M−1−3−1=M−5. The base station and the UE can determine a UE group ID G-ID for a UE group where the UE is located according to a UE-ID and an obtained grouping number M1 of Rel-16 GWUS UEs. For example, G-ID=UE-ID mod M1. In this way, the UE can detect its corresponding GWUS according to the obtained G-ID. It is then determined whether other wake-up signals need to be detected according to whether a common wake-up signal and/or a sub-UE group and/or a Rel-15 UE group are/is configured.

The configuration method according to the present embodiment may be performed via physical layer signaling and/or media access control (MAC) signaling and/or radio resource control (RRC) signaling and/or system information (SI).

The above-described embodiment 1 and embodiment 2 may be implemented separately or in combination. For example, when the two embodiments are implemented in combination, the UE grouping number on a paging carrier may be determined according to the method of the embodiment 1, and then the UE grouping number configured with a certain time offset value may be determined according to the method of the embodiment 2.

Embodiment 3

In the embodiment 3, schemes for multiplexing wake-up signals correspondingly applied to NB-IoT UEs will be described.

In a Rel-16 NB-IoT UE-group WUS design, there are three schemes for multiplexing wake-up signals: time division multiplexing, single code division multiplexing, and single code division multiplexing plus time division multiplexing. The multiplexing scheme between a Rel-16 UE-group WUS and a Rel-15 WUS can be configured, and configuration and operation schemes related to the Rel-16 UE-group WUS and the Rel-15 WUS can be determined according to the configured multiplexing scheme between the Rel-16 UE-group WUS and the Rel-15 WUS.

If the multiplexing scheme between a Rel-16 UE-group WUS and a Rel-15 WUS is time division multiplexing, the Rel-16 UE-group WUS and the Rel-15 WUS are located on different time-frequency resources, and a common wake-up signal or a sub-UE group wake-up signal (if the sub-UE group wake-up signal is configured) is functioning on the time-frequency resource multiplexed with the Rel-16 UE-group WUS.

If the multiplexing scheme between a Rel-16 UE-group WUS and a Rel-15 WUS is single code division multiplexing, only one time-frequency resource is configured for the multiplexing between the Rel-16 UE-group WUS and the Rel-15 WUS and for the multiplexing among different Rel-16 UE-group WUSs. In this case, the Rel-15 WUS may be configured as a common wake-up signal or predefined as a common wake-up signal. Alternatively, one wake-up signal may be separately configured as a common wake-up signal for Rel-16 UE-group WUS UEs.

If the multiplexing scheme between a Rel-16 UE-group WUS and a Rel-15 WUS is single code division multiplexing plus time division multiplexing, a plurality of (e.g., n) time-frequency resources are configured. A part of the Rel-16 UE-group WUS UEs and the Rel-15 WUS UEs are multiplexed on one time-frequency resource, and the other Rel-16 UE-group WUS UEs are multiplexed on the remaining (e.g., n−1) time-frequency resources. Herein, the Rel-15 WUS may be set as a common wake-up signal for the part of the Rel-16 UE-group WUS UEs multiplexed with the Rel-15 WUS UEs in the same time-frequency resource. Meanwhile, common wake-up signals, i.e., n−1 common wake-up signals, are respectively configured for other (e.g., n−1) time-frequency resources.

Alternatively, the multiplexing scheme for the wake-up signals may be any two of the three multiplexing schemes, i.e., the time division multiplexing, the single code division multiplexing, and the single code division multiplexing plus time division multiplexing. Any two multiplexing schemes can be configured by the system or predefined. The multiplexing scheme between the Rel-16 UE-group WUS and the Rel-15 WUS can be configured to be one of the two multiplexing schemes, and then according to a certain configured multiplexing scheme, relevant operations of the above-mentioned multiplexing scheme can be performed correspondingly.

Alternatively, the UE may select a corresponding operation according to the number of configured time-frequency resources. For example, if only one time-frequency resource is configured, the multiplexing scheme between the Rel-16 UE-group WUS and the Rel-15 WUS and among different Rel-16 UE-group WUSs is single code division multiplexing. In this case, the Rel-15 WUS may be configured as a common wake-up signal or predefined as a common wake-up signal. Alternatively, one wake-up signal may be separately configured as a common wake-up signal for the Rel-16 UE-group WUS UEs. If two or more than two (e.g., n) time-frequency resources are configured, the multiplexing scheme between the Rel-16 UE-group WUS and the Rel-15 WUS and among different Rel-16 UE-group WUSs is single code division multiplexing plus time division multiplexing. In this case, a part of the Rel-16 UE-group WUS UEs and the Rel-15 WUS UEs are multiplexed on one time-frequency resource, and the other Rel-16 UE-group WUS UEs are multiplexed on the remaining (e.g., n−1) time-frequency resources. Herein, the Rel-15 WUS may be set as a common wake-up signal for the part of the Rel-16 UE-group WUS UEs multiplexed with the Rel-15 WUS UEs in the same time-frequency resource. Meanwhile, common wake-up signals, i.e., n−1 common wake-up signals, are respectively configured for other (e.g., n−1) time-frequency resources.

Alternatively, if two or more than two (e.g., n) time-frequency resources are configured, the multiplexing scheme between the Rel-16 UE-group WUS and the Rel-15 WUS may be time division multiplexing or single code division multiplexing plus time division multiplexing. Specifically, whether the multiplexing scheme is time division multiplexing or single code division multiplexing plus time division multiplexing can be configured through signaling. If time division multiplexing is configured, the Rel-16 UE-group WUS and the Rel-15 WUS are located on different time-frequency resources, and a common wake-up signal or a sub-UE group wake-up signal (if the sub-UE group wake-up signal is configured) is functioning on the time-frequency resource multiplexed with the Rel-16 UE-group WUS. If single code division multiplexing plus time division multiplexing is configured, a part of the Rel-16 UE-group WUS UEs and the Rel-15 WUS UEs are multiplexed on one time-frequency resource, and other Rel-16 UE-group WUS UEs are multiplexed on the remaining (e.g., n−1) time-frequency resources. Herein, the Rel-15 WUS may be set as a common wake-up signal for the part of the Rel-16 UE-group WUS UEs multiplexed with the Rel-15 WUS UEs in the same time-frequency resource. Meanwhile, common wake-up signals, i.e., n−1 common wake-up signals, are respectively configured for other (e.g., n−1) time-frequency resources.

The configuration method according to the present embodiment may be performed via physical layer signaling and/or media access control (MAC) signaling and/or radio resource control (RRC) signaling and/or system information (SI).

Embodiment 4

In the embodiment 4, schemes for multiplexing wake-up signals correspondingly applied to MTC UEs will be described.

In the Rel-15 MTC specification, a narrow band is defined as six consecutive physical resource blocks (PRBs) that do not overlap in the frequency domain. The bandwidth of a Rel-15 MTC WUS is two consecutive PRBs, and the frequency position of the lowest PRB is indicated by higher layer signaling. Therefore, in Rel-15, an MTC WUS occupies only two PRBs in a narrow band, and the remaining four consecutive PRBs are not used for MTC WUSs. The remaining four PRBs can be utilized in the Rel-16 MTC UE-group WUS design. Thus, if the Rel-16 MTC UE-group WUS adopts a design similar to that of the Rel-15 MTC WUS, there are up to two sets of two consecutive PRBs available in the frequency domain.

Therefore, in a Rel-16 MTC UE-group WUS design, there are three schemes for multiplexing wake-up signals: frequency division multiplexing, single code division multiplexing, and single code division multiplexing plus frequency division multiplexing. The multiplexing scheme between a Rel-16 UE-group WUS and a Rel-15 WUS can be configured, and configuration and operation schemes related to the Rel-16 UE-group WUS and the Rel-15 WUS can be determined according to the configured multiplexing scheme between the Rel-16 UE-group WUS and the Rel-15 WUS.

If the multiplexing scheme between the Rel-16 UE-group WUS and the Rel-15 WUS is frequency-division multiplexing, the Rel-16 UE-group WUS and the Rel-15 WUS are located on different time-frequency resources, and a common wake-up signal or a sub-UE group wake-up signal (if the sub-UE group wake-up signal is configured) is functioning on the time-frequency resource multiplexed with the Rel-16 UE-group WUS.

If the multiplexing scheme between a Rel-16 UE-group WUS and a Rel-15 WUS is single code division multiplexing, only one time-frequency resource is configured for the multiplexing between the Rel-16 UE-group WUS and the Rel-15 WUS and for the multiplexing among different Rel-16 UE-group WUSs. In this case, the Rel-15 WUS may be configured as a common wake-up signal or predefined as a common wake-up signal. Alternatively, one wake-up signal may be separately configured as a common wake-up signal for Rel-16 UE-group WUS UEs.

If the multiplexing scheme between a Rel-16 UE-group WUS and a Rel-15 WUS is single code division multiplexing plus division multiplexing, a plurality of (e.g., n) time-frequency resources are configured. A part of the Rel-16 UE-group WUS UEs and the Rel-15 WUS UEs are multiplexed on one time-frequency resource, and the other Rel-16 UE-group WUS UEs are multiplexed on the remaining (e.g., n−1) time-frequency resources. Herein, the Rel-15 WUS may be set as a common wake-up signal for the part of the Rel-16 UE-group WUS UEs multiplexed with the Rel-15 WUS UEs in the same time-frequency resource. Meanwhile, common wake-up signals, i.e., n−1 common wake-up signals, are respectively configured for other (e.g., n−1) time-frequency resources.

Alternatively, the multiplexing scheme for the wake-up signals may be any two of the three multiplexing schemes, i.e., the frequency division multiplexing, the single code division multiplexing, and the single code division multiplexing plus frequency division multiplexing. Any two multiplexing schemes can be configured by the system or predefined. The multiplexing scheme between the Rel-16 UE-group WUS and the Rel-15 WUS can be configured to be one of the two multiplexing schemes, and then according to a certain configured multiplexing scheme, relevant operations of the above-mentioned multiplexing scheme can be performed correspondingly.

Alternatively, the UE may select a corresponding operation according to the number of configured time-frequency resources. For example, if only one time-frequency resource is configured, the multiplexing scheme between the Rel-16 UE-group WUS and the Rel-15 WUS and among different Rel-16 UE-group WUSs is single code division multiplexing. In this case, the Rel-15 WUS may be configured as a common wake-up signal or predefined as a common wake-up signal. Alternatively, one wake-up signal may be separately configured as a common wake-up signal for the Rel-16 UE-group WUS UEs. If two or more than two (e.g., n) time-frequency resources are configured, the multiplexing scheme between the Rel-16 UE-group WUS and the Rel-15 WUS and among different Rel-16 UE-group WUSs is single code division multiplexing plus frequency division multiplexing. In this case, a part of the Rel-16 UE-group WUS UEs and the Rel-15 WUS UEs are multiplexed on one time-frequency resource, and the other Rel-16 UE-group WUS UEs are multiplexed on the remaining (e.g., n−1) time-frequency resources. Herein, the Rel-15 WUS may be set as a common wake-up signal for the part of the Rel-16 UE-group WUS UEs multiplexed with the Rel-15 WUS UEs in the same time-frequency resource. Meanwhile, common wake-up signals, i.e., n−1 common wake-up signals, are respectively configured for other (e.g., n−1) time-frequency resources.

Alternatively, if two or more than two (e.g., n) time-frequency resources are configured, the multiplexing scheme between the Rel-16 UE-group WUS and the Rel-15 WUS may be frequency division multiplexing or single code division multiplexing plus frequency division multiplexing. Specifically, whether the multiplexing scheme is frequency division multiplexing or single code division multiplexing plus frequency division multiplexing can be configured through signaling. If frequency division multiplexing is configured, the Rel-16 UE-group WUS and the Rel-15 WUS are located on different time-frequency resources, and a common wake-up signal or a sub-UE group wake-up signal (if the sub-UE group wake-up signal is configured) is functioning on the time-frequency resource multiplexed with the Rel-16 UE-group WUS. If single code division multiplexing plus frequency division multiplexing is configured, a part of the Rel-16 UE-group WUS UEs and the Rel-15 WUS UEs are multiplexed on one time-frequency resource, and other Rel-16 UE-group WUS UEs are multiplexed on the remaining (e.g., n−1) time-frequency resources. Herein, the Rel-15 WUS may be set as a common wake-up signal for the part of the Rel-16 UE-group WUS UEs multiplexed with the Rel-15 WUS UEs in the same time-frequency resource. Meanwhile, common wake-up signals, i.e., n−1 common wake-up signals, are respectively configured for other (e.g., n−1) time-frequency resources.

The configuration method according to the present embodiment may be performed via physical layer signaling and/or media access control (MAC) signaling and/or radio resource control (RRC) signaling and/or system information (SI).

The method and related equipment of the present application have been described above in conjunction with preferred embodiments. Those skilled in the art will understand that the methods shown above are exemplary only. The method of the present application is not limited to the steps and their sequences shown above. The network nodes and user equipments shown above may comprise more modules, e.g., modules that can be developed or will be developed in the future for base stations or UEs, etc. Various identities shown above are only exemplary rather than restrictive, and the present application is not limited to the information elements served as examples of these identities. Those skilled in the art can make many changes and modifications based on the teaching of the illustrated embodiment.

It should be understood that the above embodiments of the present application may be implemented through software, hardware or a combination of software and hardware. For example, various components in the base station and the user equipment in the above embodiments may be implemented through various devices, including but not limited to an analog circuit device, a digital circuit device, a digital signal processing (DSP) circuit, a programmable processor, an application specific integrated circuit (ASIC), a field programmable gate array (FPGA), a programmable logic devices (CPLD), and the like.

In the present application, the "base station" refers to a mobile communication data and control switching center with large transmission power and wide coverage area and includes resource allocation scheduling function, data receiving and transmitting function, and the like. The "user equipment" refers to a user mobile terminal such as a terminal device, e.g., a mobile phone, a notebook, or the like, which can perform wireless communication with a base station or a micro base station.

In addition, the embodiments of the present application disclosed here may be implemented on a computer program product. More specifically, the computer program product may be described as below. The computer program product has a computer-readable medium on which computer program logic is encoded. The computer program logic provides relevant operations to implement the above-described technical solution of the present application when the computer program logic is executed on a computing apparatus. The computer program logic enables a processor to execute the operations (methods) described in the embodiments of the present application when the computer program logic is executed on at least one processor of a computing system. Such an arrangement of the present application is typically provided as software, a code, and/or other data structures that are configured or encoded on a computer-readable medium, such as an optical medium (e.g., a CD-ROM), a floppy disk or a hard disk, or, for example, firmware or microcodes on one or more other media like ROM or RAM or PROM chips, or downloadable software images, shared database, and the like in one or more modules. Software or firmware or such configuration may be installed on a computing apparatus such that one or more processors in the computing apparatus perform the technical solutions described in the embodiments of the present application.

Further, each functional module or each feature of the base station apparatus and the terminal apparatus used in each of the above embodiments may be realized or performed by a circuit, which is typically one or more integrated circuits. Circuits designed to execute each function described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor, or the processor may be a conventional processor, a controller, a microcontroller, or a state machine. The general-purpose processor or each circuit described above may be configured by a digital circuit or may be configured by a logic circuit. Furthermore, with the advance in semiconductor technology, an advanced technology may appear to replace the existing circuit integration technology, and an integrated circuit obtained based on such an advanced technology may also be used by the present application.

Although the present application has been described in conjunction with the preferred embodiments of the present application, it will be understood by those skilled in the art that various modifications, substitutions, and changes may be made to the present application without departing from the spirit and scope of the present application. Therefore, the present application should not be limited by the above-described embodiments but should be limited by the appended claims and their equivalents.

The program running on an equipment according to the present invention may be a program that enables a computer to implement the functions of the embodiments of the present invention by controlling a central processing unit (CPU). The program or information processed by the program may be temporarily stored in a volatile memory (e.g., random access memory (RAM)), a hard disk drive (HDD), a non-volatile memory (e.g., flash memory), or other memory systems.

The program for implementing the functions of each of the embodiments according to the present invention may be recorded on a computer-readable recording medium. The corresponding functions can be achieved by causing a computer system to read programs recorded on the recording medium and execute the programs. The so-called "computer system" herein may be a computer system embedded in the equipment, and may include an operating system or hardware (e.g., peripheral devices). The "computer-readable recording medium" may be a semiconductor recording medium, an optical recording medium, a magnetic recording medium, a recording medium for dynamically storing programs for a short time, or any other recording medium readable by a computer.

The various features or functional modules of the device used in the embodiments described above may be implemented or performed by circuitry (e.g., A monolithic or multi-chip integrated circuit). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, the present invention can also be implemented by using these new integrated circuit technologies.

As described above, the embodiments of the present invention have been described in detail with reference to the accompanying drawings. However, the specific structure is not limited to the embodiments described above, and the present invention also includes any design changes without departing from the spirit of the present invention. In addition, various modifications can be made to the present invention within the scope of the claims, and embodiments obtained by appropriately combining the technical means disclosed in different embodiments are also included in the technical scope of the present invention. In addition, components having the same effect described in the above embodiments may be substituted for each other.

What is claimed is:

1. A method performed by a user equipment (UE), the method comprising:
receiving, from a base station, system information including a grouping wake-up signal (WUS) configuration for performing a grouping wake-up on a WUS group associated with the UE, the grouping WUS configuration including a number of WUS groups;
monitoring a grouping WUS for the WUS group associated with the UE according to the received grouping WUS configuration;
monitoring a following paging occasion (PO) for detecting a paging message when the grouping WUS is detected; and
determining an index of the WUS group associated with the UE based on the number of WUS groups.

2. The method according to claim 1, further comprising:
determining the index of the WUS group associated with the UE, on a paging carrier where the UE is located, further based on a weight of the paging carrier and a maximum value in the weight.

3. The method according to claim 1, wherein the grouping WUS includes:
an Rel-15 grouping WUS for performing the grouping wake-up on each UE divided group of an Rel-15 WUS group, and
an Rel-16 grouping WUS for performing the grouping wake-up on each UE divided group of an Rel-16 WUS group.

4. The method according to claim 1, wherein:
the WUS group is divided based on a time offset to obtain a UE divided group on which the grouping wake-up is performed,
the time offset comprises a time offset value between an ending time of the grouping WUS and a starting time of the PO corresponding to the grouping WUS, and
the time offset includes:
a first time offset timeoffsetDRX corresponding to discontinuous reception (DRX),
a second time offset timeoffset-eDRX-Short corresponding to enhanced DRX, and
a third time offset timeoffset-eDRX-Long.

5. The method according to claim 4, wherein UEs that are grouped and configured after an Rel-16 WUS group, that is grouped based on the time offset, are further divided into groups.

6. The method according to claim 5, wherein the grouping WUS configuration includes:
a common WUS for waking up all UE divided groups of the Rel-16 WUS group at a same time, and
a partial WUS for waking up a part of the UE divided groups of the Rel-16 WUS group.

7. The method according to claim 3, wherein the Rel-15 grouping WUS and the Rel-16 grouping WUS are multiplexed based on at least one of a time division multiplexing scheme, a single code division multiplexing scheme, and a single code division multiplexing plus time division multiplexing scheme.

8. The method according to claim 7, wherein:
when the time division multiplexing scheme is used, UEs adopting the Rel-16 grouping WUS and UEs adopting the Rel-15 grouping WUS are multiplexed on different time-frequency resources,
when the single code division multiplexing scheme is used, the UEs adopting the Rel-16 grouping WUS and the UEs adopting the Rel-15 grouping WUS are multiplexed on a same time-frequency resource, and
when the single code division multiplexing plus time division multiplexing scheme is used, some of the UEs adopting the Rel-16 grouping WUS and all the UEs adopting the Rel-15 grouping WUS are multiplexed on a same time-frequency resource, and remaining UEs adopting the Rel-16 grouping WUS are multiplexed on one or more time-frequency resources different from the same time-frequency resource.

9. A user equipment (UE), comprising:
one or more processors; and
at least one memory coupled to the one or more processors, the at least one memory storing computer-executable instructions that, when executed by the one or more processors, cause the UE to:
receive, from a base station, system information including a grouping wake-up signal (WUS) configuration for performing a grouping wake-up on a WUS group associated with the UE, the grouping WUS configuration including a number of WUS groups;
monitor a grouping WUS for the WUS group associated with the UE according to the received grouping WUS configuration;
monitor a following paging occasion (PO) for detecting a paging message when the grouping WUS is detected; and
determine an index of the WUS group associated with the UE based on the number of WUS groups.

10. The UE according to claim 9, wherein the computer-executable instructions, when executed by the one or more processors, further cause the UE to:
determine the index of the WUS group associated with the UE, on a paging carrier where the UE is located, further based on a weight of the paging carrier and a maximum value in the weight.

11. The UE according to claim 9, wherein the grouping WUS includes:
an Rel-15 grouping WUS for performing the grouping wake-up on each UE divided group of an Rel-15 WUS group, and
an Rel-16 grouping WUS for performing the grouping wake-up on each UE divided group of an Rel-16 WUS group.

12. The UE according to claim 9, wherein:
the WUS group is divided based on a time offset to obtain the UE divided group on which the grouping wake-up is performed,
the time offset comprises a time offset value between an ending time of the grouping WUS and a starting time of the PO corresponding to the grouping WUS, and
the time offset includes:
a first time offset timeoffsetDRX corresponding to discontinuous reception (DRX),
a second time offset timeoffset-eDRX-Short corresponding to enhanced DRX, and
a third time offset timeoffset-eDRX-Long.

13. The UE according to claim 12, wherein UEs that are grouped and configured after an Rel-16 WUS group, that is grouped based on the time offset, are further divided into groups.

14. The UE according to claim 13, wherein the grouping WUS configuration includes:
a common WUS for waking up all UE divided groups of the Rel-16 WUS group at a same time, and a partial WUS for waking up a part of the UE divided groups of the Rel-16 WUS group.

15. The UE according to claim 11, wherein the Rel-15 grouping WUS and the Rel-16 grouping WUS are multiplexed based on at least one of a time division multiplexing scheme, a single code division multiplexing scheme, and a single code division multiplexing plus time division multiplexing scheme.

16. The UE according to claim 15, wherein:
when the time division multiplexing scheme is used, UEs adopting the Rel-16 grouping WUS and UEs adopting the Rel-15 grouping WUS are multiplexed on different time-frequency resources,
when the single code division multiplexing scheme is used, the UEs adopting the Rel-16 grouping WUS and the UEs adopting the Rel-15 grouping WUS are multiplexed on a same time-frequency resource, and
when the single code division multiplexing plus time division multiplexing scheme is used, some of the UEs adopting the Rel-16 grouping WUS and all the UEs adopting the Rel-15 grouping WUS are multiplexed on a same time-frequency resource, and remaining UEs adopting the Rel-16 grouping WUS are multiplexed on one or more time-frequency resources different from the same time-frequency resource.

* * * * *